United States Patent Office 3,338,867
Patented Aug. 29, 1967

3,338,867
SILANES AND SILOXANES CONTAINING OXETANE GROUPS
Edwin P. Plueddemann, Midland, Mich., assignor to Dow Corning Corporation, Midland, Mich., a corporation of Michigan
No Drawing. Filed July 24, 1963, Ser. No. 297,197
7 Claims. (Cl. 260—46.5)

This invention relates to new and useful silanes and siloxanes containing oxetane groups.

More particularly, this invention relates to new silanes and siloxanes having the general or unit formula

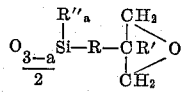

wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R radical being bonded to the silicon atom via a silicon-carbon bond, R' is a member selected from the group consisting of the hydrogen atom, hydrocarbon radicals, halogenated hydrocarbon radicals, hydrocarbonoxy radicals, hydroxyalkyl radicals and carboxyalkyl radicals, R'' is a member selected from the group consisting of hydrocarbon radicals, halogenated hydrocarbon radicals, hydrocarbonoxy radicals and acyloxy radicals, and $a$ is an integer from 0 to 3 inclusive.

This invention also relates to new copolymers consisting essentially of the siloxane units (A)

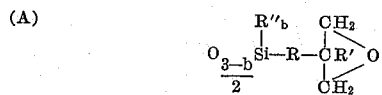

wherein R, R' and R'' are as defined above and $b$ is an integer from 0 to 2 inclusive and (B)

wherein R'' and $a$ are as defined above.

The products of this invention are useful as protective coatings, as treating (coupling) agents for glass cloth to be used in the preparation of laminates having improved wet strength and as co-monomers in the preparation of silicone modified polyether rubbers. The products of this invention can be cured by reacting them with oxetane curing catalysts such as boron trifluoride or other Lewis acids to form cured moldings, coatings and films. Numerous other uses of the products of this invention will be obvious to those skilled in the art.

The silanes and siloxanes of this invention can be prepared by various methods. For example, when R is a divalent radical consisting of carbon and hydrogen atoms, the compounds can be prepared by the reaction of a silane or siloxane containing silicon bonded hydrogen atoms and an olefin containing an oxetane ring. This reaction can be illustrated by the following equation:

(1)

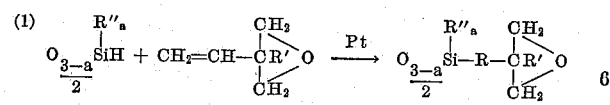

In the formulae in Equation 1, R, R', R'' and $a$ have the above defined meanings. It is preferred that the reaction be carried out employing a platinum catalyst (in the form of chloroplatinic acid) although the reaction can be carried out simply by heating the two reactants.

Olefins containing oxetane groups such as employed in Equation 1 above can be prepared by reacting omega unsaturated aldehydes having the general formula

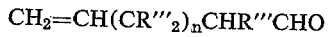

$$CH_2{=}CH(CR'''_2)_nCHR'''CHO$$

wherein R''' is a hydrogen atom or a monovalent hydrocarbon group free of aliphatic unsaturation and $n$ is zero or an integer, with formaldehyde in the presence of a base such as an alkali metal or alkaline earth metal hydroxide. The product of this reaction is then treated with an acid anhydride, such as acetic anhydride, to form the monoester of the diol. The monoacetate of the diol obtained by this reaction is then treated with alcoholic potassium hydroxide to form the oxetane ring. Alternatively, the sulfuric acid ester of the product obtained above can be prepared and then the sulfuric acid ester treated with alkali to form the oxetane ring. These reactions can be illustrated by the following equations:

(2)

$$CH_2{=}CH(CR'''_2)_nCHR'''CHO + HCHO \xrightarrow{OH^-}$$

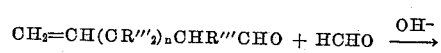

This reaction is believed to be a two-step process involving a crossed aldol condensation followed by a crossed Cannizzaro reaction and can be illustrated by the following equations:

(2a)

$$CH_2{=}CH(CR'''_2)_nCHR'''CHO + HCHO \xrightarrow{OH^-}$$

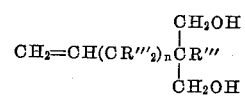

(2b)

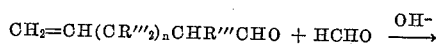

$$CH_2{=}CH(CR'''_2)_n\overset{CH_2OH}{\underset{CHO}{C}}R'''CHO + HCHO + MOH \longrightarrow$$

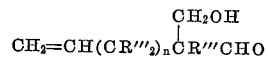

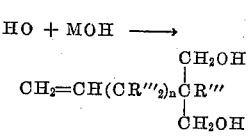

(M represents an alkali metal or alkaline earth metal.)

The product obtained in Equation 2 is then converted to an oxetane compound as follows:

(3)

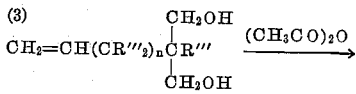

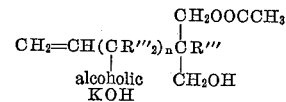

(3')

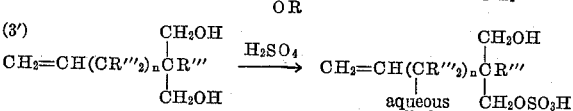

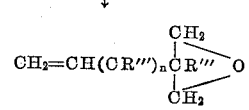

When R is a divalent radical consisting of carbon, hydrogen and oxygen atoms, the silanes and siloxanes of this invention can be prepared, for example, by the reactions illustrated by the following equations:

(4) 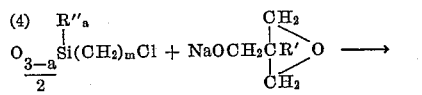 →

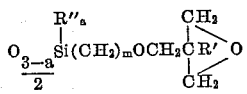

(5) 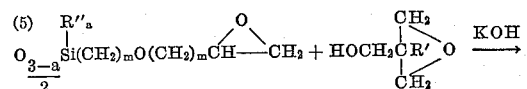 →

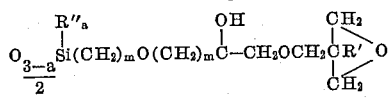

(6) 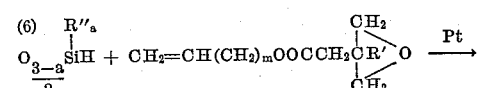 →

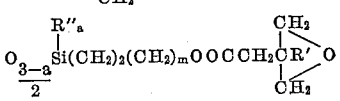

In the formulae in Equations 4, 5 and 6, R', R" and $a$ have the above defined meanings and $m$ is an integer equal to at least 1.

In Equation 4, the alkoxides employed can be prepared by the reaction of sodium (or other metal) with the corresponding hydroxides which are well-known compounds. This reaction can be illustrated by the equation:

(4a) 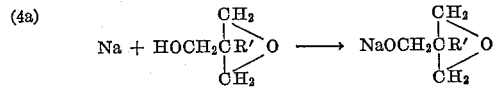

In Equation 6, the unsaturated esters containing an oxetane ring employed can be prepared by the reaction or salts of carboxylated oxetanes with unsaturated halides. The carboxylated oxetanes are well-known compounds and the salts easily obtained therefrom. This reaction can be illustrated by the equation:

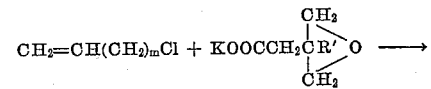 →

(6a) 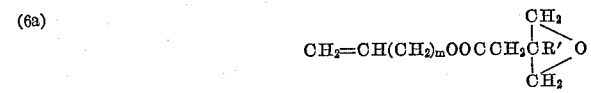

The copolymers of this invention can be prepared employing conventional techniques such as cohydrolysis and condensation of the appropriate silanes or equilibration of a mixture of the appropriate siloxanes or they can be prepared by reacting siloxane copolymers containing SiH group or SiRCl groups as shown above.

In order that those skilled in the art can better understand how the present invention can be practiced, the following examples are given by way of illustration and not by way of limitation.

Example 1

177 g. of the monoallylether of trimethylolpropane,

was added to 107.8 g. (an equimolar amount) of concentrated (98 percent) sulfuric acid with stirring and cooling to maintain a temperature below 35° C. 185.8 g. of the resulting sulfuric acid ester was dropped into a refluxing solution of 63.3 g. of sodium hydroxide in 88.5 g. of water while collecting a distillate that separated into two layers. The upper layer was dried over sodium sulfate and then distilled with about 28.8 g. (about 94.4 percent pure) of 3-allyloxymethyl-3-ethyloxetane,

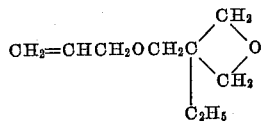

being obtained over a temperature range of 60–67° C. at about 2 mm. of pressure.

Example 2

14.9 g. of the 3-allyloxymethyl-3-ethyloxetane prepared above was mixed with 6 g. of 1,1,2,2-tetramethyldisiloxane, $H(CH_3)_2SiOSi(CH_3)_2H$, and 2 drops of a 1 percent platinum solution (as chloroplatinic acid in isopropanol). The mixture was then heated to 120° C. for one hour until all the silicon bonded hydrogen atoms had reacted. The mixture was then stripped to a pot temperature of 120° C. at 1 mm. of pressure. There remained in the pot an amber oily product which had the structure:

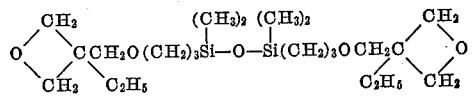

The structure of this compound was confirmed by NMR (Nuclear Magnetic Resonance) analysis employing a Varian Model A–60 High Resolution Proton Magnetic Resonance Spectrometer.

Example 3

13.9 g. of the 3-allyloxymethyl-3-ethyloxetane prepared above was mixed with 10.7 g. of trimethoxysilane, $HSi(OCH_3)_3$ and 1 drop of a 1 percent platinum solution (as chloroplatinic acid in isopropanol). The mixture was heated for about 6 hours at about 100–130° C. At the end of this time all the silicon bonded hydrogen atoms had reacted. The mixture was then distilled with about 10.4 g. (about 93 percent pure) of a product having the structure:

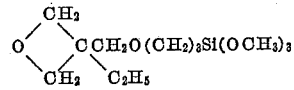

being obtained over a temperature range of 111–116° C. at about .48 mm. of pressure. The structure of this compound was confirmed by NMR analysis. Analysis of the product for percentage composition gave the following results.

Theoretical: percent C, 51.8; percent H, 9.35; percent Si, 10.1. Actual: percent C, 50.7; percent H, 9.35; percent Si, 10.3.

Example 4

1 gram of the silane prepared in Example 3 above was dissolved in a mixture of 2 cc. of methyl alcohol and 2 cc. of water. A clear solution was obtained. The resulting solution was then added to 200 cc. of water and shaken well. A piece of heat-cleaned glass cloth was wet with this solution and then allowed to dry overnight. The treated cloth was then heated for 15 minutes at 212° F. and finally heated 7 minutes at 230° F. A laminate was then prepared from the treated cloth containing 14 plies (laid up with the warp threads rotated 90° in alternate plies) impregnated with an epoxy resin, the laminate being cured 30 minutes at 150° C. and 30 p.s.i. of pressure. The resin was a low molecular weight liquid epoxy resin prepared by the reaction of bisphenol A and epichlorohydrin. It had a viscosity of 11,000–16,000 cps. and an epoxide equivalent weight of 187–193 and was cured with the theoretical amount of m-phenylenediamine. A control laminate was prepared as above except that untreated heat-cleaned glass cloth was employed.

The flexural strengths of the laminates were determined in accordance with the U.S. Federal Specification L–P 406b, Method 1031, and the compressive strength was determined in accordance with Method 1021 of that specification. Flexural and compressive strengths were also determined on samples of the laminates which had been boiled in water for 2 hours and then wiped dry, this being a test which is recognized as roughly the equivalent of standing in water at room temperature for one month. Results from the latter test are referred to hereinafter as the "2 Hr. Boil" data. The 2 Hr. Boil flexural or compressive strength times 100 divided by the strength of the laminate as molded is the "Percent Retention." The test results on the two laminates prepared above are given below. The strengths of the laminates are given in pounds per square inch (p.s.i.).

| Cloth | Flexural Strength | | | Compressive Strength | | |
|---|---|---|---|---|---|---|
| | Initial | 2 Hr. Boil | Retention, percent | Initial | 2 Hr. Boil | Retention, percent |
| Untreated | 77,550 | 51,625 | 67 | 53,833 | 22,200 | 41 |
| Treated | 82,900 | 65,100 | 79 | 48,400 | 29,400 | 61 |

The laminate from the treated cloth had improved initial strength and improved wet strength retention.

Example 5

About 100 ml. of toluene and 9.2 g. of sodium metal were placed in a 500 ml. flask equipped with stirrer, thermometer, condenser and dropping funnel. Then 23.3 g. of allyl alcohol was added to the flask and the mixture heated to about 90–100° C. The sodium disappeared and the contents of the pot became milky. Another 5 ml. of allyl alcohol was added near the end of the reaction (after about 2 hours). A nitrogen sweep was used during the reaction. The solution was then allowed to cool.

31 g. of 3,3-bis(chloromethyl)oxetane,

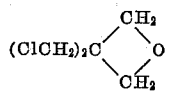

and about 100 ml. of toluene were placed in a 500 ml. flask equipped as above. Then the sodium allyloxide, NaOCH$_2$CH=CH$_2$, solution prepared above was added and the mixture heated at about 80° C. with stirring. The mixture was allowed to cool overnight. The mixture was then filtered to remove the solids, more allyl alcohol added to the filtrate, and then the filtrate heated at reflux for about 8 hours. The solution was allowed to cool and then filtered again and then the filtrate distilled. About 11.9 g. of a 50–50 mixture of 3-allyloxymethyl-3-chloromethyloxetane,

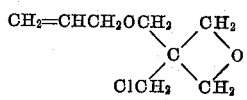

and 3,3-bis(allyloxymethyl)oxetane,

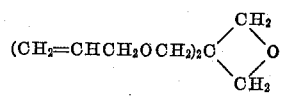

was obtained over a temperature range of 96–108° C. at 10 mm. of pressure. This mixture was then separated into the two individual components employing a gas-liquid chromatographic column.

Example 6

When the 3-allyloxymethyl-3-chloromethyloxetane prepared in Example 5 is reacted with trimethoxysilane in the presence of a platinum catalyst, a silane having the formula

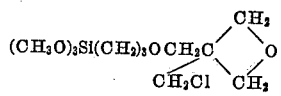

is obtained.

Example 7

When

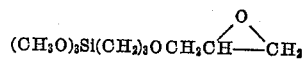

is reacted with 3-hydroxymethyl-3-chloromethyloxetane,

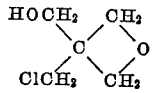

in the presence of an alkali metal hydroxide such as potassium hydroxide, a silane having the formula

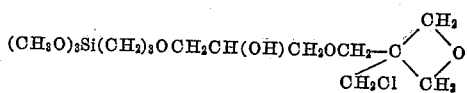

is obtained. Hydrolysis and condensation of this new silane yields a siloxane having the formula

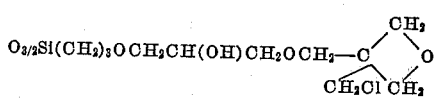

Example 8

When the allylester of 3-carboxymethyl-3-hydroxymethyloxetane is reacted with phenyldimethoxysilane in the presence of a platinum catalyst, a silane having the formula

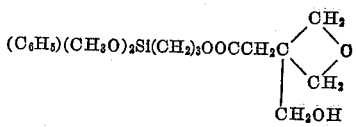

is obtained. When this new silane is hydrolyzed and condensed, a siloxane having the formula

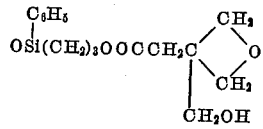

is obtained.

Example 9

When methyldimethoxysilane is reacted with 3-(propenyl-2)oxetane,

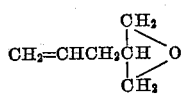

in the presence of a platinum catalyst, a silane having the formula

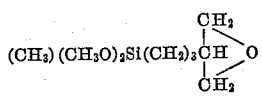

is obtained. When this new silane is hydrolyzed and condensed, a siloxane having the formula

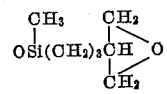

is obtained.

Example 10

When the silanes and oxetanes below are reacted in the presence of a platinum catalyst the indicated product is obtained. Hydrolysis and condensation of the products containing hydrolyzable groups yields the corresponding siloxanes.

| | Silane | Oxetane | Product |
|---|---|---|---|
| (a) | $(C_6H_{11})(CH_3O)_2SiH$ | $CH_2=CHCOOCH_2-C\begin{smallmatrix}CH_2\\ \\CH_2\end{smallmatrix}O$ <br> $HOOCH_2$ | $(C_6H_{11})(CH_3O)_2Si(CH_2)_2COOCH_2-C\begin{smallmatrix}CH_2\\ \\CH_2\end{smallmatrix}O$ <br> $HOOCH_2$ |
| (b) | $(CH_3C_6H_4)(CH_3O)_2SiH$ | $CH_2=CHCH_2OCH_2-C\begin{smallmatrix}CH_2\\ \\CH_2\end{smallmatrix}O$ <br> $C_6H_4CH_3$ | $(CH_3C_6H_4)(CH_3O)_2Si(CH_2)_3OCH_2-C\begin{smallmatrix}CH_2\\ \\CH_2\end{smallmatrix}O$ <br> $C_6H_4CH_3$ |
| (c) | $(CH_3COO)(CH_3)_2SiH$ | $CH_2=CHCH_2OCH_2-C\begin{smallmatrix}CH_2\\ \\CH_2\end{smallmatrix}O$ <br> $H_5C_6$ | $(CH_3COO)(CH_3)_2Si(CH_2)_3OCH_2-C\begin{smallmatrix}CH_2\\ \\CH_2\end{smallmatrix}O$ <br> $H_5C_6$ |
| (d) | $(C_6H_5CH_2)(C_2H_5)_2SiH$ | $CH_2=CHCOOCH_2-C\begin{smallmatrix}CH_2\\ \\CH_2\end{smallmatrix}O$ <br> $CH_2OC_2H_5$ | $(C_6H_5CH_2)(C_2H_5)_2Si(CH_2)_2COOCH_2-C\begin{smallmatrix}CH_2\\ \\CH_2\end{smallmatrix}O$ <br> $H_5C_2OH_2C$ |
| (e) | $(CF_3CH_2CH_2)(CH_3)_2SiH$ | $CH_2=CHCH_2OCH_2-C\begin{smallmatrix}CH_2\\ \\CH_2\end{smallmatrix}O$ <br> $H_{11}C_6$ | $(CF_3CH_2CH_2)(CH_3)_2Si(CH_2)_3OCH_2C\begin{smallmatrix}CH_2\\ \\CH_2\end{smallmatrix}O$ <br> $H_{11}C_6$ |
| (f) | $(CH_3)_2(C_6H_5O)SiH$ | $CH_2=CHCOOCH_2-C\begin{smallmatrix}CH_2\\ \\CH_2\end{smallmatrix}O$ <br> $H_5C_6OH_2C$ | $(CH_3)_2(C_6H_5O)Si(CH_2)_2COOCH_2C\begin{smallmatrix}CH_2\\ \\CH_2\end{smallmatrix}O$ <br> $H_5C_6OH_2C$ |
| (g) | $(Cl_2C_6H_3)(CH_3O)_2SiH$ | $CH_2=CHCH_2OCH_2-C\begin{smallmatrix}CH_2\\ \\CH_2\end{smallmatrix}O$ <br> $Cl_2H_3C_6$ | $(Cl_2C_6H_3)(CH_3O)_2Si(CH_2)_3OCH_2-C\begin{smallmatrix}CH_2\\ \\CH_2\end{smallmatrix}O$ <br> $Cl_2H_3C_6$ |
| (h) | $(CH_3)_3SiH$ | $CH_2=CHCH_2OCH_2-C\begin{smallmatrix}CH_2\\ \\CH_2\end{smallmatrix}O$ <br> $H_5C_6H_2C$ | $(CH_3)_3Si(CH_2)_3OCH_2-C\begin{smallmatrix}CH_2\\ \\CH_2\end{smallmatrix}O$ <br> $H_6C_6H_2C$ |
| (i) | $H(CH_3)_2Si-[OSi(CH_3)_2]_xOSi(CH_3)_2H$ | $CH_2=CHCH_2OCH_2C\begin{smallmatrix}CH_2\\ \\CH_2\end{smallmatrix}O$ <br> $H_5C_2$ | $O\begin{smallmatrix}CH_2\\ \\CH_2\end{smallmatrix}C-CH_2O(CH_2)_3\overset{C_2H_5}{\underset{CH_2}{Si}}-[OSi(CH_3)_2-]_xO\overset{(CH_3)_2}{Si}(CH_3)_3$ <br> $O\overset{C_2H_5}{CH_2C}\begin{smallmatrix}CH_2\\ \\CH_2\end{smallmatrix}O$ |

$x$ is an integer, i.e., 0, 1, 2, 10, 100, 10,000, etc.

Example 11

When the mixtures of silanes below are hydrolyzed and condensed, copolymers are obtained containing the indicated siloxane units.

| Silane Mixture | Copolymer Units |
|---|---|
| (a) $CH_3Si(OCH_3)_3$<br>$(CH_3)_2Si(OCH_3)_2$<br>$C_6H_5Si(OCH_3)_3$<br>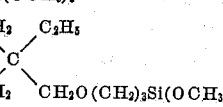 | $CH_3SiO_{3/2}$<br>$(CH_3)_2SiO$<br>$C_6H_5SiO_{3/2}$<br>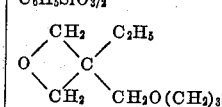 |
| (b) $(C_2H_5)(CH_3)Si(OC_2H_5)_2$<br>$(C_6H_5)(CH_3)Si(OC_2H_5)_2$<br>$(C_6H_5)_2(CH_3)SiOCH_3$<br>$(CH_3)_3SiOCH_3$<br>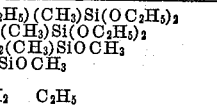 | $(C_2H_5)(CH_3)SiO$<br>$(C_6H_5)(CH_3)SiO$<br>$(C_6H_5)_2(CH_3)SiO_{1/2}$<br>$(CH_3)_3SiO_{1/2}$<br>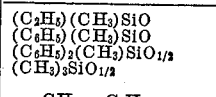 |
| (c) $(CH_3)HSi(OCH_3)_2$<br>$C_{18}H_{37}Si(OCH_3)_3$<br>$C_3H_7Si(OCH_2OCH_3)_3$<br>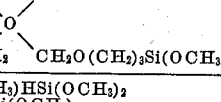 | $(CH_3)HSiO$<br>$C_{18}H_{37}SiO_{3/2}$<br>$C_3H_7SiO_{3/2}$<br>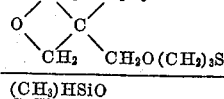 |
| (d) $CF_3C_6H_4Si(OCH_3)_3$<br>$(CF_3CH_2CH_2)(CH_3)Si(OCH_3)_2$<br>$(CF_3CH_2CH_2)(CH_3)_2SiOCH_3$<br>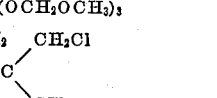 | $CF_3C_6H_4SiO_{3/2}$<br>$(CF_3CH_2CH_2)(CH_3)SiO$<br>$(CF_3CH_2CH_2)(CH_3)_2SiO_{1/2}$<br>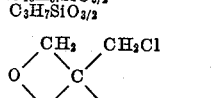 |
| (e) $Cl_2C_6H_3Si(OCH_3)_3$<br>$CH_3C_6H_4Si(OCH_3)_3$<br>$(CH_3)_2Si(OC_6H_5)_2$<br>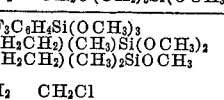 | $Cl_2C_6H_3SiO_{3/2}$<br>$CH_3C_6H_4SiO_{3/2}$<br>$(CH_3)_2SiO$<br>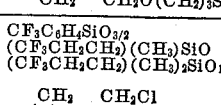 |
| (f) $Si(OCH_3)_4$<br>$C_6H_{11}Si(OC_3H_7)_3$<br>$C_6H_5CH_2Si(OCH_3)_3$<br>$(C_2H_5)_2Si(OC_2H_5)_2$<br>$(C_6H_5)(CH_2=CH)(CH_3)SiOCH_3$<br>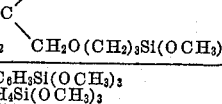 | $SiO_2$<br>$C_6H_{11}SiO_{3/2}$<br>$C_6H_4CH_2SiO_{3/2}$<br>$(C_2H_5)_2SiO$<br>$(C_6H_5)(CH_2=CH)(CH_3)SiO_{1/2}$<br>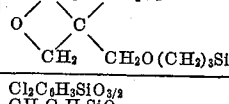 |

That which is claimed is:

1. Organosilicon compounds having the general formula

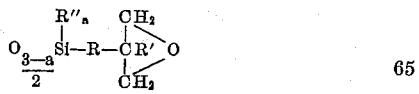

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R radical being bonded to the silicon atom via a silicon-carbon bond, R' is a member selected from the group consisting of the hydrogen atom, hydrocarbon radicals, halogenated hydrocarbon radicals, hydrocarbonoxy radicals, hydroxyalkyl radicals and carboxyalkyl radicals, R'' is a member selected from the group consisting of hydrocarbon radicals, halogenated hydrocarbon radicals, hydrocarbonoxy radicals and acyloxy radicals, and a is an integer from 0 to 3 inclusive.

2. Siloxanes having the formula

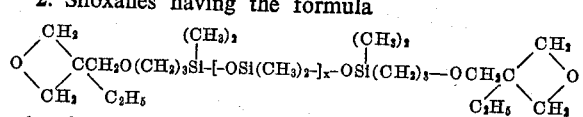

wherein $x$ is an integer.

3. The siloxane having the formula

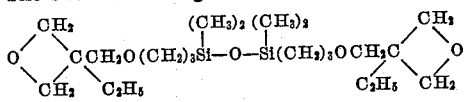

4. The silane having the formula

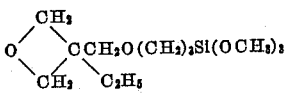

5. The silane having the formula

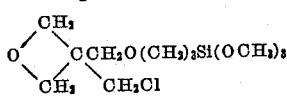

6. The silane having the formula

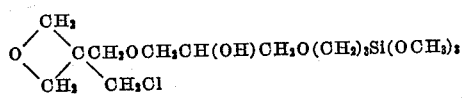

7. Copolymers consisting essentially of the siloxane units (A)

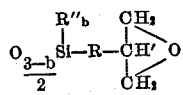

wherein

R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R radical being bonded to the silicon atom via a silicon-carbon bond, R' is a member selected from the group consisting of the hydrogen atom, hydrocarbon radicals, halogenated hydrocarbon radicals, hydrocarbonoxy radical, hydroxyalkyl radicals and carboxyalkyl radicals, R'' is a member selected from the group consisting of hydrocarbon radicals, halogenated hydrocarbon radicals, hydrocarbonoxy radicals and acyloxy radicals, and $b$ is an integer from 0 to 2 inclusive, and (B) $R''_a SiO_{4-a/2}$, wherein $R''$ is as defined above and $a$ is an integer from 0 to 3 inclusive.

References Cited

FOREIGN PATENTS 920,856  3/1963  Great Britain.

OTHER REFERENCES

Plueddemann et al.: 81, Journal American Chemical Society, p. 2632 (1959).

DONALD E. CZAJA, *Primary Examiner.*

LEON J. BERCOVITZ, *Examiner.*

M. I. MARQUIS, *Assistant Examiner.*